D. A. KENDALL.
PROCESS OF PREPARING TIRE TREADS.
APPLICATION FILED OCT. 24, 1916.
1,290,576.
Patented Jan. 7, 1919.
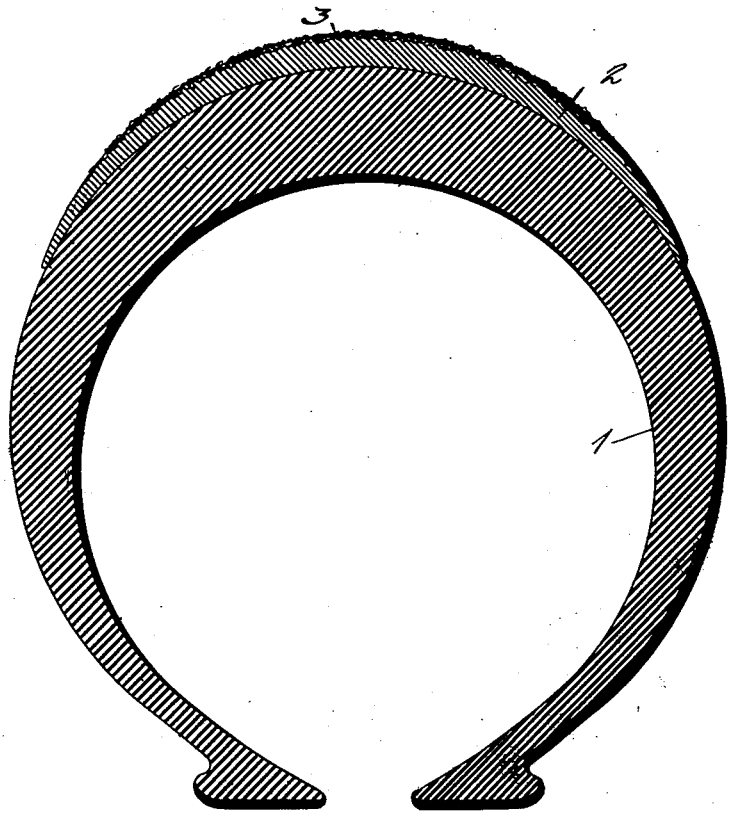
WITNESSES
INVENTOR
DELASKA A. KENDALL
BY
ATTORNEYS

UNITED STATES PATENT OFFICE.

DELASKA A. KENDALL, OF SAN DIEGO, CALIFORNIA.

PROCESS OF PREPARING TIRE-TREADS.

1,290,576.     Specification of Letters Patent.     Patented Jan. 7, 1919.

Application filed October 24, 1916. Serial No. 127,467.

*To all whom it may concern:*

Be it known that I, DELASKA A. KENDALL, a citizen of the United States, and a resident of San Diego, in the county of San Diego and State of California, have invented a certain new and useful Improvement in Processes of Preparing Tire-Treads, of which the following is a specification.

My invention relates to improvements in tire treads, especially those that are used on automobiles, wagons, buggy carriage tires, etc., and it consists in the combinations, constructions and arrangements herein described and claimed.

An object of my invention is to provide a tire tread which will have longer life than the ordinary pneumatic rubber tire.

A further object of my invention is to provide a tread which will not be affected by water or grease, and which is also puncture proof against broken glass, sharp stones, etc.

A further object of my invention is to provide a tread which is non-skid, even on ice.

Other objects and advantages will appear in the following specification, and the novel features of the invention will be particularly pointed out in the appended claims.

My invention is illustrated in the accompanying drawing, which is a section through a tire provided with my improved tread.

In carrying out my invention, I make use of any suitable fiber, such as cotton, hemp, jute, etc. This may be in the form of woven material, such as canvas, rope, or the like, or may be raw fiber.

The fiber is treated with a solution made by heating together tar, rosin and turpentine. Various proportions may be used, but I prefer a mixture in the proportions of five pounds of tar, eight ounces of rosin and sixteen ounces of turpentine. These three ingredients are heated together and the fiber is saturated with the solution. Fiber treated in this manner becomes hard and when used for the tread of pneumatic tires, it gathers up sand, small gravel and grit of all kinds, which becomes thoroughly embedded in the tread.

The grit which the fiber collects will adhere firmly to the roadway, so that even on ice, the tire is firmly held by means of the particles of grit which cut into the ice, so that all danger of skidding is eliminated. A tread thus formed greatly increases the life of the tire, since the tread is constantly accumulating grit, thereby adding to its wearing surface.

In the drawing 1 denotes the outer casing, and 2 the improved tread with particles of grit, sand, etc., shown at 3.

Instead of treating the fiber before applying it to the tire, it may be done after application to the tire, and to this end the fiber is secured in any suitable manner to the tread portion of the tire, and then the solution may be applied by means of a brush by dipping or in any other suitable manner. Thus I may take strips of woven material and wind them around the tread of the tire until a sufficient thickness has been reached. Then by applying the mixture of tar, rosin and turpentine to the surface, the fabric will absorb the mixture which when cool will render the tread hard. Now when the tire is used the grit gradually accumulates and forces itself into the body of the tread, so as to enhance the wearing qualities thereof.

Obviously the tread might be formed in other ways, as by treating a layer of the fiber or fabric with the solution, then letting it dry and cutting off a width of the treated fabric or fiber equivalent to the worn portion of the tread of the tire and then applying the same and securing the ends together.

I claim:

1. The herein described process of preparing a wear-resisting tire tread, which consists in forming on a tire casing a band of vegetable fiber, impregnating the same with a plastic composition, consisting of a hot solution of tar, and rosin, cooling the applied mixture and subsequently applying grit to the prepared surface.

2. The herein described process of preparing a wear-resisting tire tread consisting in forming on a tire casing a band of vegetable fiber, impregnating the same with a plastic composition, consisting of a hot solution of tar and rosin in turpentine, and cooling the applied mixture whereby grit is caused to adhere to the plastic composition when the tread is rolled along the ground.

3. The herein described process of preparing a wear resisting tire tread which consists in forming on a tire casing a band of vegetable fiber, impregnating the same with a plastic composition and subsequently applying grit to the prepared surface.

DELASKA A. KENDALL.

Witnesses:
W. P. WHITNEY,
Dr. W. G. OLIVER.